United States Patent
Hwang et al.

(10) Patent No.: US 12,252,638 B2
(45) Date of Patent: *Mar. 18, 2025

(54) ADHESIVE FILM

(71) Applicant: 3M INNOVATIVE PROPERTIES COMPANY, St. Paul, MN (US)

(72) Inventors: Kyosung Hwang, Seoul (KR); Yongsuk Yang, Hwaseong-si (KR); Ki-Sun Kim, Seoul (KR); Gyu Jin Jung, Gyeonggi-do (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/769,698

(22) PCT Filed: Oct. 13, 2020

(86) PCT No.: PCT/IB2020/059613
§ 371 (c)(1),
(2) Date: Apr. 15, 2022

(87) PCT Pub. No.: WO2021/074793
PCT Pub. Date: Apr. 22, 2021

(65) Prior Publication Data
US 2023/0029583 A1 Feb. 2, 2023

(30) Foreign Application Priority Data
Oct. 18, 2019 (KR) .......................... 10-2019-0130023

(51) Int. Cl.
*C09J 7/29* (2018.01)
*C09J 7/35* (2018.01)
(Continued)

(52) U.S. Cl.
CPC . *C09J 7/29* (2018.01); *C09J 7/35* (2018.01); *C09J 11/04* (2013.01); *C09J 11/06* (2013.01);
(Continued)

(58) Field of Classification Search
CPC ......... C09J 7/00; C09J 7/20; C09J 7/29; C09J 7/30; C09J 7/35; C09J 11/00; C09J 11/04;
(Continued)

(56) References Cited

U.S. PATENT DOCUMENTS 3,723,223 A * 3/1973 Le Compte ................ C09J 7/10
525/110
8,181,688 B2 5/2012 Johnson et al.
(Continued)

FOREIGN PATENT DOCUMENTS

JP 2004176011 A 6/2004
WO WO-2018019711 A1 * 2/2018 ............. A01N 43/50
(Continued)

OTHER PUBLICATIONS

Polyox "PolyoxTM Versatile Water-Soluble Resins for Industrial Applications" 2023.*
(Continued)

*Primary Examiner* — John L Goff, II
(74) *Attorney, Agent, or Firm* — Jeffrey M. Olofson (57) ABSTRACT

The present invention relates to an adhesive film comprising an adhesive layer; a photothermal conversion layer containing a light absorber and a thermally decomposable resin; and an adhesive base film layer disposed between the adhesive layer and the photothermal conversion layer, wherein the adhesive base film layer contains a multifunctional epoxy resin, a binder resin, a curing agent, and a curing catalyst. The adhesive film according to the present invention may be
(Continued)

able to simplify a processing process of a substrate, and prevent damage to the substrate and circuits or elements formed on the substrate.

12 Claims, 1 Drawing Sheet

(51) Int. Cl.
    *C09J 11/04*     (2006.01)
    *C09J 11/06*     (2006.01)
    *C09J 163/00*     (2006.01)
    *C09J 183/04*     (2006.01)

(52) U.S. Cl.
    CPC ........... *C09J 163/00* (2013.01); *C09J 183/04* (2013.01); *C09J 2301/408* (2020.08); *C09J 2433/00* (2013.01); *C09J 2463/00* (2013.01)

(58) Field of Classification Search
    CPC ........ C09J 11/06; C09J 163/00; C09J 183/00; C09J 183/04; C09J 2463/00; C09J 2433/00; H01L 21/6836; H01L 2221/68386; B32B 7/12; B32B 2405/00; B32B 38/10
See application file for complete search history.

(56) References Cited

U.S. PATENT DOCUMENTS

| | | | |
|---|---|---|---|
| 8,267,143 B2 | 9/2012 | George et al. | |
| 8,764,026 B2 | 7/2014 | George et al. | |
| 8,789,569 B2 | 7/2014 | Noda | |
| 8,919,412 B2 | 12/2014 | George et al. | |
| 11,667,815 B2* | 6/2023 | Hwang | B32B 27/308 |
| | | | 428/354 |
| 2002/0076566 A1* | 6/2002 | Brandys | C08G 59/188 |
| | | | 428/458 |
| 2006/0029760 A1 | 2/2006 | Kreft et al. | |
| 2009/0017248 A1* | 1/2009 | Larson | C09J 7/38 |
| | | | 428/41.5 |
| 2010/0041211 A1 | 2/2010 | Noda | |
| 2011/0073847 A1 | 3/2011 | Kobayashi et al. | |
| 2011/0159284 A1 | 6/2011 | Choi | |
| 2011/0297771 A1 | 12/2011 | Noda | |
| 2011/0300709 A1 | 12/2011 | Shintani | |
| 2013/0096232 A1* | 4/2013 | Theophanous | C08J 5/244 |
| | | | 523/400 |
| 2015/0060869 A1 | 3/2015 | Ro et al. | |
| 2015/0166847 A1* | 6/2015 | Morita | H01L 24/29 |
| | | | 252/500 |

FOREIGN PATENT DOCUMENTS

| | | |
|---|---|---|
| WO | 2018109711 A1 | 6/2018 |
| WO | 2021116908 A1 | 6/2021 |

OTHER PUBLICATIONS

International Search Report for PCT Application No. PCT/IB20/59613 mailed on Mar. 26, 2021, 2 pages.

* cited by examiner

ADHESIVE FILM

CROSS REFERENCE TO RELATED APPLICATIONS

This application is a national stage filing under 35 U.S.C. 371 of PCT/IB2020/059613, filed 13 Oct. 2020, which claims the benefit of Korean Application No. 10-2019-0130023, filed 18 Oct. 2019, the disclosure of which is incorporated by reference in their entirety herein.

BACKGROUND

The present invention relates to an adhesive film, and more particularly, to an adhesive film disposed between a substrate to be processed and a support in a process of processing the substrate.

In various fields, it is often preferred to use a thin substrate or a flexible substrate. In a process of forming such a thin substrate or using a flexible substrate, a process of bonding the substrate to a hard support and then separating the substrate from the hard support after the processing of the substrate is completed has been proposed.

As an example, in the field of quartz devices, it is preferred to reduce the thickness of a quartz wafer so as to increase an oscillation frequency. In particular, in a semiconductor industry, efforts are being made to further reduce the thickness of the semiconductor wafer for high-density manufacturing by chip lamination technology and reduction in thickness of a semiconductor package.

The thickness reduction is performed by a so-called rear-surface grinding of the semiconductor wafer on a surface opposite to a surface having a pattern-formed circuit. In order to reduce the thickness, a method has been proposed in which while a wafer is firmly fixed on the hard support with an adhesive, a bottom surface of the wafer is ground and transferred and then the wafer is separated from the hard support. By supporting the wafer using the hard support, it is possible to prevent the wafer from being broken during rear-surface grinding and transferring and to process the wafer to a thin thickness level.

On the other hand, as another example, a flexible display device capable of enhancing aesthetic functions and imparting multifunctions in use has been developed, and at this time, it is preferable to use a flexible substrate. The flexible display device has been expected to be a next-generation display device that replaces a portable computer, an electronic newspaper or a smart card, and print media such as books, newspapers, and magazines. As such a display device is enhanced in aesthetic functions, reduced in thickness, and reduced in weight, a variety of materials is required and various flexible substrates are applied and used. For example, a thin film metal sheet, plastic, and the like may be used as the flexible substrate.

However, the flexible substrate is hardly applied to existing manufacturing equipment for display devices which is designed for a glass or quartz substrate due to its good bending characteristics. For example, there is a limitation that transfer by track equipment or robots or storage in a cassette is difficult.

Accordingly, the flexible substrate is bonded on the hard support before elements are formed, the support supports the flexible substrate while the elements are formed on the flexible substrate, and the support is separated from the flexible substrate after the elements are formed on the substrate. Therefore, even if the flexible substrate is used, it is possible to provide a flexible display device in which elements are stably formed.

However, this process has a problem in that the process is complicated and costs and time are added by adding processes of applying an adhesive between the substrate and the hard support, curing the adhesive, etc. Furthermore, in the process of separating the substrate from the hard support after the processing of the substrate, there is a problem that the wafer or substrate itself is damaged, or the circuits of the wafer and the elements of the flexible substrate are damaged.

SUMMARY

An object of the present invention is to provide an adhesive film capable of maintaining high adhesion during a processing process and easily peeling a substrate fixed on a support from the support after the processing process. Due to this, in the present invention, it is possible to prevent damage and breakage to a substrate and elements or circuits formed on the substrate by physical force when the substrate is separated from the support.

Another object of the present invention is to provide an adhesive film capable of preventing damage to a substrate to be processed and elements or circuits formed on the substrate due to excellent heat resistance and an excellent light blocking effect and being used, particularly, even in a process requiring high vacuum/high heat resistance of 250° C. or higher. More specifically, the present invention can be applied to a process of requiring ramp-up at a very fast speed, or a process of excluding the ramp-up process itself and exposing a material to a high temperature at a time so that thermal shock applied to the material is significant.

Yet another object of the present invention is to provide an adhesive film capable of reducing costs and time by simplifying a process of fixing a substrate to be processed on a support and peeling the substrate from the support.

In order to solve the problems in the prior art described above, an adhesive film of the present invention comprises an adhesive layer; a photothermal conversion layer containing a light absorber and a thermally decomposable resin; and an adhesive base film layer disposed between the adhesive layer and the photothermal conversion layer, wherein the adhesive base film layer contains a multi-functional epoxy resin, a binder resin, a curing agent, and a curing catalyst.

The adhesive layer may be a silicon-based adhesive layer.

The thermally decomposable resin may contain two kinds of acrylic resins having a functional group of —COOH or —OH and different weight average molecular weights.

The adhesive base film layer may have adhesion to both the adhesive layer and the photothermal conversion layer.

The curing agent may be a phenolic curing agent.

The binder resin may be an elastomer resin having a weight average molecular weight of 500,000 to 1,500,000.

The binder resin may be an acryl or rubber-based elastomer resin.

The binder resin may have an epoxy group in a chain.

The adhesive base film layer may further comprise a filler.

The filler may include at least one selected from the group consisting of $TiO_2$, silica, copper powder, alumina, and carbon black.

A weight ratio of the binder resin to the epoxy resin of the adhesive base film layer may be 25:75 to 55:45.

According to the adhesive film of the present invention, it is possible to maintain high adhesion during a processing process and easily peel the substrate fixed on the support from the support after the processing process. Due to this, it is possible to prevent damage and breakage to a substrate and elements or circuits formed on the substrate by physical force when the substrate is separated from the support. Further, the adhesive film according to the present invention has excellent heat resistance and an excellent light blocking effect, and particularly, is able to be used even in a process of requiring high vacuum/high heat resistance of 250° C. or higher. Further, according to the adhesive film of the present invention, it is possible to reduce costs and time by simplifying a process of fixing a substrate to be processed on a support and peeling the substrate from the support.

DETAILED DESCRIPTION

Advantages and features of the present invention, and methods for accomplishing the same will be apparent from embodiments to be described in detail below with reference to the accompanying drawings. However, the present invention is not limited to the following embodiments, but may be implemented in various different forms. The embodiments are provided only to complete disclosure of the present invention and to fully provide a person having ordinary skill in the art to which the present invention pertains with the category of the invention, and the present invention will be just defined by the scope of the appended claims.

The shapes, sizes, ratios, angles, numbers, and the like illustrated in the drawings for describing embodiments of the present invention are illustrative, and thus the present invention is not limited to details illustrated in the drawings. Throughout the specification, like reference numerals denote like components. Further, in describing the present invention, when it is determined that a detailed explanation of known related technologies may unnecessarily obscure the subject matter of the present invention, the detailed description thereof will be omitted.

When terms "comprising," "having," etc. are used in this specification, other matters other than the details described may be added unless the expression of "only" is used. When a component is expressed in a singular form, the component includes plural form unless expressly stated otherwise.

Components should be interpreted to include an error range unless otherwise expressly stated.

In the description of a position relation, when a position relation between two parts is described using the terms such as "on", "above", "below", and "next", one or more other parts may also be positioned between the two parts unless the expression of "immediately" or "directly" is used.

Respective features of embodiments of the present invention can be partially or entirely bonded or combined with each other, and can be technically interlocked or driven variously.

Hereinafter, embodiments of the present invention will be described in detail with reference to the drawings. The following embodiments are provided as examples so that the spirit of the present invention can be fully transferred to those skilled in the art. Therefore, the present invention is not limited to embodiments to be described below and may also be embodied in different forms.

Figure 1:
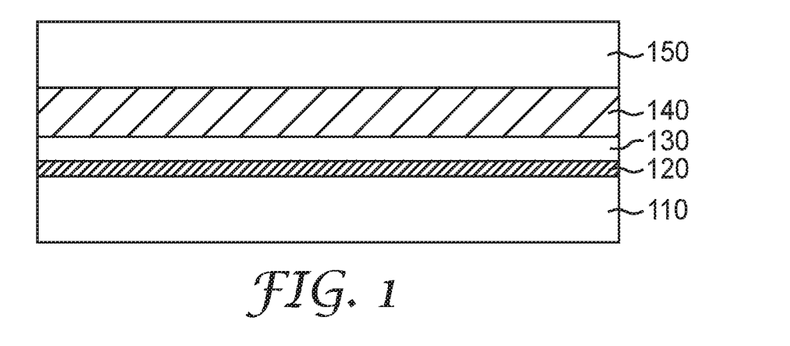
FIG. 1 is a cross-sectional view of an adhesive film according to the present invention.

FIG. 1 is a cross-sectional view of an adhesive film according to an embodiment of the present invention. Referring to FIG. 1, the adhesive film according to an embodiment of the present invention comprises a first liner 110, a photothermal conversion layer 120, an adhesive base film layer 130, an adhesive layer 140, and a second liner 150, which are sequentially laminated.

The adhesive film of the present invention is in the form of a film, and is formed by directly bonding the photothermal conversion layer 120 and the adhesive layer 140 to both surfaces of the adhesive base film layer 130 formed in the film form. That is, in the adhesive film of the present invention, the adhesive base film layer 130 serves as a support film, and is formed in a structure having a plurality of layers without a hard base film such as a PI film or a PEN film. In the process of processing the substrate later, the adhesive layer 140 is bonded to the substrate, and the photothermal conversion layer 120 is bonded to the hard support.

In more detail, the photothermal conversion layer 120 is divided when irradiated with radiant energy such as a laser and may be separated from the support without damage to the substrate or the elements or circuits on the substrate.

The photothermal conversion layer 120 includes a light absorber and a thermally decomposable resin. The radiant energy applied to the photothermal conversion layer 120 in the form of a laser or the like is absorbed by the light absorber and converted into thermal energy. The generated thermal energy rapidly increases the temperature of the photothermal conversion layer 120, and the temperature reaches a thermal decomposition temperature of the thermally decomposable resin (organic component) in the photothermal conversion layer 120, thereby causing thermal decomposition of the resin. The gas generated by thermal decomposition forms a pore layer (such as a space) in the photothermal conversion layer 120 and divides the photothermal conversion layer 120 into two parts, and as a result, the support and the substrate are separated from each other.

The light absorber may absorb radiant energy and convert the absorbed radiant energy into thermal energy. In addition, the light absorber may function to block light to prevent the substrate from being damaged by a laser or the like.

Although the light absorber varies depending on a wavelength of the laser, examples of the light absorber that can be used include carbon black, graphite powder, microparticle metal powder such as iron, aluminum, copper, nickel, cobalt, manganese, chromium, zinc and tellurium, metal oxide powder such as black titanium oxide and dyes and pigments such as an aromatic diamino-based metal complex, an aliphatic diamine-based metal complex, an aromatic dithiol-base metal complex, a mercaptophenol-based metal complex, a squarylium-based compound, a cyanine-based dye, a methine-based dye, a naphthoquinone-based dye, and an anthraquinone-based dye. The light absorber may be in the form of a film including a vapor deposited metal film.

Among these light absorbers, carbon black is particularly useful, and the reason is that the carbon black significantly reduces a force required to separate the substrate from the support after irradiation and accelerates the separation.

A particle size of the light absorber in the photothermal conversion layer 120 may be about 20 nm to about 2000 nm, preferably about 50 nm to about 1000 nm, more preferably about 100 nm to about 350 nm.

When the particle size of the light absorber is less than about 20 nm, dispersion is difficult, and the smaller the particle size, the higher the surface area, so that a large amount of light absorber cannot be loaded and the loading content is limited. In addition, when the particle size of the light absorber is more than about 2000 nm, the laser blocking performance decreases, and the division performance of the photothermal conversion layer 120 by the laser decreases. In addition, as the particle size of the light absorber increases, film formability decreases, the dispersion stability after dispersion decreases, and the time required until forming and coating a crude solution should be short.

The content of the light absorber in the photothermal conversion layer 120 may be about 5 wt % to about 80 wt %, preferably about 10 wt % to about 60 wt %, more preferably about 20 wt % to about 50 wt % based on the total weight of the photothermal conversion layer 120.

When the content of the light absorber is less than about 5 wt %, separation by a laser is difficult. In addition, when the content of the light absorber is more than about 80 wt %, after the division of the photothermal conversion layer 120 by the laser, a part of the photothermal conversion layer 120 separated by the laser remains on the surface of the adhesive base film layer 130, and at this time, the adhesion becomes very low due to a high carbon content. In this case, there is a problem in that the adhesive base film layer 130 is not bonded well to a removal tape in a process of removing the adhesive base film layer 130 and the adhesive layer 140 with the removal tape later and thus it is difficult to be removed. In addition, as the content of the light absorber increases, the adhesion of the surface of the photothermal conversion layer 120 becomes too low, and as a result, the lamination with the support is difficult, and the dispersion of the light absorber is not uniform.

The thermally decomposable resin in the photothermal conversion layer 120 includes an acrylic resin. Preferably, the acrylic resin includes a monomer selected from the group consisting of methyl methacrylate (MMA), hydroxyl ethyl methacrylate (HEMA), ethyl acrylate (EA), butyl acrylate (BA), acrylonitrile (AN), and combinations thereof. Preferably, the acrylic resin may be selected from combinations of at least three of methyl methacrylate (MMA), hydroxyl ethyl methacrylate (HEMA), ethyl acrylate (EA), butyl acrylate (BA), and acrylonitrile (AN). The acrylic resin may have a suitable molecular weight, Tg, heat resistance, and functional groups.

The content of the acrylic resin may be about 5 wt % to about 80 wt %, preferably about 15 wt % to about 60 wt %, more preferably about 40 wt % to about 60 wt % based on the total weight of the photothermal conversion layer 120. When the content of the acrylic resin is less than about 5 wt %, film formability decreases, it is difficult to control the thickness of the photothermal conversion layer 120, and the adhesion of the surface of the photothermal conversion layer 120 is too low to make lamination with the support difficult. In addition, when the content of the acrylic resin is more than about 80 wt %, a physical force is largely required when dividing the photothermal conversion layer 120 after laser irradiation, it is difficult to separate the substrate from the support, and damage to the substrate or elements or circuits formed on the substrate may occur.

The acrylic resin preferably includes two types of acrylic resins having different weight average molecular weights, more preferably, a high molecular weight acrylic resin and a low molecular weight acrylic resin. The high molecular weight acrylic resin allows the photothermal conversion layer 120 to have excellent heat resistance, and the low molecular weight acrylic resin improves the adhesion of the photothermal conversion layer 120 and is advantageous for film formation.

At this time, the Tg (glass transition temperature) of the high molecular weight acrylic resin is 0° C. to 10° C., and the Tg of the low molecular weight acrylic resin may be −10° C. to 0° C. When the Tg of the high molecular weight acrylic resin is higher than 10° C. and the Tg of the low molecular weight acrylic resin is higher than 0° C., the heat resistance of the photothermal conversion layer 120 may be improved, but surface adhesion may be reduced. On the other hand, when the Tg of the high molecular weight acrylic resin is lower than 0° C. and the Tg of the low molecular weight acrylic resin is lower than −10° C., the bonding performance may be improved, but heat resistance may be reduced.

The weight average molecular weight of the high molecular weight acrylic resin may be about 400,000 g/mol to about 15,000,000 g/mol, preferably about 500,000 g/mol to about 1,200,000 g/mol, more preferably about 700,000 g/mol to about 1,000,000 g/mol. When the weight average molecular weight of the high molecular weight acrylic resin is smaller than about 400,000 g/mol, the heat resistance of the photothermal conversion layer 120 decreases, and when the weight average molecular weight thereof is greater than about 15,000,000 g/mol, the coating of the photothermal conversion layer 120 and the mixing of the crude solution are not easy.

The weight average molecular weight of the low molecular weight acrylic resin may be about 50,000 g/mol to about 600,000 g/mol, preferably about 100,000 g/mol to about 500,000 g/mol, more preferably about 400,000 g/mol to about 500,000 g/mol. When the weight average molecular weight of the low molecular weight acrylic resin is smaller than about 50,000 g/mol, the heat resistance of the photothermal conversion layer 120 decreases, and when the weight average molecular weight thereof is greater than about 600,000 g/mol, the lamination performance of the photothermal conversion layer 120 is deteriorated.

A weight ratio of the high molecular weight acrylic resin to the low molecular weight acrylic resin may be about 1:4 to about 4:1, preferably about 1:3 to about 3:1, more preferably about 1:2 to about 2:1. When the content of the low molecular weight acrylic resin is significantly smaller than that of the high molecular weight acrylic resin, the lamination performance of the photothermal conversion layer 120 is deteriorated. In addition, when the content of the high molecular weight acrylic resin is significantly smaller than the content of the low molecular weight acrylic resin, the heat resistance of the photothermal conversion layer 120 is lowered, and the adhesion on the divided surface of the photothermal conversion layer 120 is strong after the laser irradiation, and thus, a physically large force is required to be separated.

The thermally decomposable resin has a —COOH or —OH functional group. Preferably, the thermally decomposable resin includes an acrylic resin having a —COOH or —OH functional group. The photothermal conversion layer 120 including a thermally decomposable resin having a —COOH or —OH functional group is not a pressure-sensitive adhesive type. By having a —COOH or —OH functional group, the photothermal conversion layer may be bonded to the support by hydrogen bonding, and for example, may be bonded to a silanol group on a glass surface of the support made of glass by hydrogen bonding. At this time, the hydrogen bonding provides initial adhesion for bonding the adhesive layer to the support, and the adhesion between the photothermal conversion layer 120 and the support is greatly increased due to heat generated in a process after the bonding process.

The —COOH or —OH functional group may have an acid value of at least about 1 mgKOH/g, preferably at least about 5 mgKOH/g. The lamination performance of the photothermal conversion layer 120 is based on the —COOH or —OH functional group. When the acid value of the —COOH or —OH functional group is lower than about 1 mgKOH/g, the lamination performance is deteriorated. The upper limit of the acid value of —COOH or —OH is not a problem. However, due to a chemical structure, the —COOH or —OH functional group may have an acid value of preferably about 1 mgKOH/g to about 50 mgKOH/g, more preferably about 1 mgKOH/g to about 30 mgKOH/g, most preferably about 10 mgKOH/g to about 20 mgKOH/g.

The photothermal conversion layer 120 may further include an inorganic filler. The inorganic filler functions to prevent re-adhesion of the photothermal conversion layer 120 after being divided due to the formation of a pore layer as a result of thermal decomposition of the thermally decomposable resin. Therefore, after processing the substrate, when the photothermal conversion layer 120 is irradiated with the laser and separated, a physical force required for separation of the substrate and the support may be further reduced.

The inorganic filler may be selected from the group consisting of $SiO_2$, $Al_2O_3$, $TiO_2$ and combinations thereof. In particular, in the case of $TiO_2$, there is an additional light blocking effect on the substrate.

A particle size of the inorganic filler in the photothermal conversion layer 120 may be about 20 nm to about 2000 nm, preferably about 50 nm to about 1000 nm, more preferably about 100 nm to about 350 nm. When the particle size of the inorganic filler is less than about 20 nm, dispersion of the inorganic filler is not easy during film production, and there is a limit to the amount that can be loaded. In addition, when the particle size of the inorganic filler is greater than about 2000 nm, film formability decreases and dispersion persistence after dispersion decreases.

The content of the inorganic filler in the photothermal conversion layer 120 may be about 4 wt % to about 60 wt %, preferably about 5 wt % to about 50 wt %, more preferably about 5 wt % to about 30 wt % based on the total weight of the photothermal conversion layer 120. When the content of the inorganic filler is less than about 4 wt %, after the separation process by laser irradiation, the adhesion of the separated surface is large and thus, the photothermal conversion layer 120 may be re-bonded over time. In addition, when the content of the inorganic filler is greater than about 60 wt %, the adhesion of the photothermal conversion layer 120 is too low to make lamination on the support difficult, film formability decreases, and dispersion is not uniform.

The photothermal conversion layer 120 may further include a dispersant. The content of the dispersant may be about 0.1 wt % to about 10 wt %, preferably about 0.1 wt % to about 7 wt %, more preferably about 0.1 wt % to about 5 wt % based on the total weight of the photothermal conversion layer 120. When the content of the dispersant is less than about 0.1 wt %, the dispersibility of the light absorber and the inorganic filler in the photothermal conversion layer 120 may be lowered, and the dispersion persistence after dispersion may also be lowered. In addition, when the content of the dispersant is greater than about 10 wt %, the heat resistance of the photothermal conversion layer 120 is deteriorated, additives to be added are decomposed at a high temperature, and a weight loss is increased.

The thickness of the photothermal conversion layer 120 is about 1 μm to about 30 μm, preferably about 3 μm to about 20 μm, more preferably about 5 μm to about 15 μm. When the thickness of the photothermal conversion layer 120 is less than about 1 μm, an upper adhesive layer may directly affect the material, and the laser blocking performance may be deteriorated due to the light absorber. In addition, when the thickness of the photothermal conversion layer 120 is greater than about 30 μm, a lot of adhesive residues may remain on the support after laser irradiation.

The photothermal conversion layer 120 is formed on the adhesive base film layer 130 in a film form. When the photothermal conversion layer 120 is applied directly on the support and formed in a liquid form, if the viscosity is low, the thickness thereof is less than about 1 μm, so that the thickness cannot be sufficiently thick. For this reason, it is difficult to sufficiently use a light absorber capable of blocking the laser, and it is difficult to prevent damage to the substrate by the laser.

In the present invention, the photothermal conversion layer 120 may be applied directly on the support and formed in a liquid form, and after forming a film form through a separate application, the photothermal conversion layer 120 may be bonded to the adhesive base film layer 130 through a heat lamination process.

When the photothermal conversion layer 120 according to the present invention is formed in the form of a film, it is easy to control its thickness, and it may be more advantageous in protecting the substrate and circuits or elements formed thereon. In addition, the photothermal conversion layer 120 may have adhesion to the support of 150 gf/25 mm to 1600 gf/25 mm.

Meanwhile, the adhesive layer 140 is used to fix the substrate. After the separation of the substrate and the support by decomposition of the photothermal conversion layer 120, a substrate having the adhesive layer 140 thereon is obtained. Accordingly, the adhesive layer 140 should be easily separated from the substrate by peeling or the like. The adhesive layer 140 is in the form of a film formed on the adhesive base film layer 130, and is not a photocurable adhesive applied directly on the substrate.

The adhesive layer 140 may be a silicon-based adhesive layer. Preferably, an adhesive of the silicone-based adhesive layer may include a radical-curable silicone-based adhesive.

In a substrate processing process, particularly a semiconductor process, an adhesive film having excellent stability under high temperature and high vacuum conditions is required. However, for example, in the case of an acrylic adhesive layer, a temperature limit of the heat resistance is 230° C., and if the process is performed at a higher temperature or the process is continued for a long time, the adhesive may be melt and flow. In addition, since the acrylic adhesive and the like have a high CTE, but have a low modulus and are flexible, the acrylic adhesive and the like may move according to the deformation of the material at a high temperature. Accordingly, there is a problem in that the acrylic adhesive has insufficient heat resistance to be used in a high-temperature/high-vacuum process, and has poor adhesion under conditions such as a high temperature and the like.

On the other hand, the silicone-based adhesive layer has excellent stability and excellent heat resistance at a high temperature. In addition, since the silicone-based adhesive layer is softer than an adhesive layer made of another material, for example, an acrylic adhesive layer, the lamination performance is excellent when bonding a hard material such as a substrate and a support.

Furthermore, the soft property of the silicon-based adhesive layer allows the adhesive layer 140 to be gently removed when peeling after the substrate processing process is completed, and may prevent damage to the elements on the substrate. In addition, after the substrate processing process is completed, a high temperature may be used when the adhesive layer 140 is peeled off, so that no residue may remain on the substrate.

The adhesive layer 140 may include a curing agent. Preferably, the curing agent may be a benzoyl peroxide (BPO) curing agent. More preferably, the benzoyl peroxide (BPO) curing agent may be di-(2,4-dichlorobenzoyl) peroxide or dibenzoyl peroxide. For example, the benzoyl peroxide (BPO) curing agent may be used in a powder form or paste form.

The content of the curing agent in the adhesive layer 140 may be about 1 wt % to about 4 wt %, preferably about 1 wt % to about 3 wt %, more preferably about 2 wt % to about 3 wt % based on the total weight of the adhesive layer 140.

When the content of the curing agent is less than about 1 wt %, reactivity may be deteriorated. In addition, when the content of the curing agent is greater than about 4 wt %, an excessive amount of curing agent may not react and an unreacted curing agent may remain, and transparency and roughness of the surface of the adhesive layer 140 may decrease after curing and drying.

The adhesive layer 140 may further include an additive. The additive serves to remove moisture in the silicone-based adhesive layer 140. That is, the additive removes the moisture in the adhesive layer 140 to improve the curing efficiency of the adhesive layer 140, thereby further improving the heat resistance of the adhesive layer 140.

Preferably, the additive may be $TiO_2$. For example, in the case of $Al_2O_3$, $SiO_2$, or the like, the dispersibility is weak and thus, a dispersant is required. However, in the case of the silicone-based adhesive layer, since an aromatic solvent is used as a solvent, it is difficult to serve as most of the dispersant, and when the dispersant is added, heat resistance of silicone may be deteriorated due to the dispersant.

In the case of $TiO_2$, the dispersibility is very excellent, and the $TiO_2$ is a filler that can be applied without a special dispersant. In addition, moisture and the like may be removed to prevent the curing reaction from being lowered by moisture during radical reaction of silicon.

The size of the additive in the adhesive layer 140 is about 100 nm to about 500 nm, preferably about 200 nm to about 400 nm, more preferably about 200 nm to about 300 nm.

When the size of the additive is less than about 100 nm, dispersibility decreases and the amount that can be loaded is limited. In addition, when the size of the additive is greater than about 500 nm, there may be a problem in that the additive may precipitate over time after dispersion and the surface roughness is not good when coating the resin.

The content of the additive in the adhesive layer 140 may be about 1 wt % to about 10 wt %, preferably about 1 wt % to about 8 wt %, more preferably about 1 wt % to about 5 wt % based on the total weight of the adhesive layer 140.

When the content of the additive is less than about 1 wt %, it is difficult to exhibit the effect of the additive. In addition, when the content of the additive is greater than about 10 wt %, a problem may occur on the surface of the adhesive layer 140. The thickness of the adhesive layer 140 is about 5 μm to about 100 μm, preferably about 5 μm to about 70 μm, more preferably about 10 μm to about 60 μm. When the thickness of the adhesive layer 140 is less than about 5 μm, interlayer peeling may occur when the device is severely distorted due to low adhesion. In addition, when the thickness of the adhesive layer 140 is greater than about 100 μm, the drying efficiency is lowered when forming the adhesive layer 140, and there is a possibility that the solvent remains, and the cohesive force of the adhesive layer 140 is lowered, and thus, residues may remain. Due to the soft property of the adhesive layer 140, it may be difficult to fix the adhesive layer 140 during the substrate processing process.

On the other hand, when the adhesive layer 140 is the silicone-based adhesive layer, the photothermal conversion layer 120 includes an acrylic component, so that it is difficult to directly coat the photothermal conversion layer 120 between the silicone-based and acrylic materials. Specifically, due to the low surface energy of the silicon-based adhesive, the photothermal conversion layer 120 may not be coated on the silicon-based adhesive layer 140. On the contrary, due to a high curing temperature of the silicone-based adhesive, the adhesion of the photothermal conversion layer 120 is reduced, and the adhesive layer 140 may not be coated on the photothermal conversion layer 120.

In addition, a support film layer for supporting the photothermal conversion layer 120 and the adhesive layer 140 is required.

In order to support the photothermal conversion layer 120 and the adhesive layer 140, a solid film, for example, a PI film, or the like has been designed. However, the PI film has high rigidity and modulus, but generally exhibit a larger CTE than that of a support or a substrate such as a wafer. As a result, in the case of the PI film at a high temperature, wrinkles, distortion, warping, and the like may occur. Due to wrinkles, distortion, and warping of the PI film, an irregular surface may affect substrate processing, and process defects may occur.

In addition, in the case of using a rigid base film such as a PI film, there is a problem that a silicone primer needs to be treated on the PI film. Due to this, there is a problem that the process is increased and the cost and time are increased.

In addition, an additional adhesive layer is required to bond the PI film with the photothermal conversion layer 120, and as a result, there is a problem that the overall thickness of the film is increased and the structure is complicated.

To solve these problems, in the present invention, the adhesive base film layer 130 is formed between the photothermal conversion layer 120 and the adhesive layer 140 to support the photothermal conversion layer 120 and the adhesive layer 140 and serves to bond the photothermal conversion layer 120 and the adhesive layer 140. That is, the adhesive base film layer 130 of the present invention may reduce or prevent the problems caused by the rigid base film. Specifically, due to the low modulus compared to the PI film, the adhesive base film layer 130 is expanded or shrunk according to a thermal behavior of the material or the support to prevent problems such as wrinkles, distortion and wrapping and the like.

Furthermore, when the adhesive base film layer 130 is used instead of the rigid film, the photothermal conversion layer 120, the adhesive base film layer 130, and the adhesive layer 140 all are flexible layers made of adhesive materials to configure an adhesive film. As a result, the adhesive film itself exhibits flexibility, and thereby is more advantageous in lamination to the support and the substrate, and exhibits high adhesion.

The adhesive base film layer 130 includes an epoxy resin. Preferably, the adhesive base film layer 130 includes a multifunctional epoxy resin. More preferably, the multifunctional epoxy resin may be a novolac epoxy resin or a dicyclopentadiene epoxy resin. The multifunctional epoxy resin may increase chemical resistance by implementing high crosslinking density.

The adhesive base film layer 130 has chemical resistance to a solvent used in the photothermal conversion layer 120, for example, methyl ethyl ketone (MEK) and ethyl acrylate (EA), and a solvent used in the adhesive layer 140, for example, toluene and xylene.

In addition, even at a high temperature, the adhesive base film layer may not be expanded or shrunk between the photothermal conversion layer 120 and the adhesive layer 140. In particular, even at a curing temperature of the silicone-based adhesive layer 140, physical rigidity is maintained without shrinkage or expansion.

Furthermore, the adhesive base film layer 130 has a CTE and a modulus suitable for the process, and does not exhibit physical changes in a subsequent substrate processing process.

In addition, the adhesive base film layer 130 including an epoxy resin has adhesion with both the photothermal conversion layer 120 and the adhesive layer 140 that are not bonded to each other, and has hardness capable of supporting both the layers.

In addition, the adhesive base film layer 130 itself has adhesion, and in the manufacturing process, instead of a process of forming and laminating separate film layers, the photothermal conversion layer 120 and the adhesive layer 140 are coated and cured directly on the adhesive base film layer 130, and thus, the interlayer adhesion between the adhesive base film layer 130 and the photothermal conversion layer 120, and between the adhesive base film layer 130 and the adhesive layer 140 is very high. For this reason, the adhesive base film layer 130 has excellent heat resistance and has excellent process stability even at high temperature and high vacuum processes.

In addition, the adhesive base film layer 130 includes a binder resin. Such a binder resin allows a layer containing an epoxy resin to be filmed.

The binder resin may be an elastomer resin. Preferably, a glass transition temperature Tg of the binder resin may be at least 0° C. or higher. The binder resin having such a glass transition temperature may allow the adhesive base film layer 130 to have excellent heat resistance.

The binder resin may be an acryl or rubber-based elastomer resin. The binder resin may include a rubber-based or acrylic polymer. For example, the binder resin may include nitrile butadiene rubber (NBR) or styrene butadiene rubber (SBR).

Preferably, when the binder resin includes the NBR, the binder resin may include an acrylonitrile group of 30 wt % or higher based on the total weight of the binder resin. In this case, the binder resin may be easily dissolved in the solvent.

Preferably, when the binder resin includes an acrylic polymer, the acrylic polymer may include at least two or three monomers selected from the group consisting of ethyl acrylate (EA), hydroxyl ethyl meta acrylate (HEMA), hydroxyl ethyl acrylate (HEA), butyl acrylate (BA), poly (methyl methacrylate) (PMMA), acrylonitrile (AN), and combinations thereof.

The binder resin has a weight average molecular weight (Mw) of about 500,000 to about 1,500,000, more preferably a weight average molecular weight (Mw) of about 700,000 to about 1,000,000, more preferably a weight average molecular weight (Mw) of 800,000 to 1,000,000. The binder resin having the high molecular weight has the heat resistance of the adhesive base film layer 130.

When the weight average molecular weight of the binder resin is less than about 500,000, the chemical resistance and heat resistance of the adhesive base film layer 130 may be insufficient. In addition, when the weight average molecular weight of the binder resin is more than about 1,500,000, there is a problem that the adhesive base film layer 130 is hardly filmed, and it is difficult to be applied because the binder resin is not easily dissolved in a solvent.

Further, the binder resin may have an epoxy group in its chain. The chain of the binder resin has the epoxy group, thereby improving compatibility of the epoxy resin and the binder resin.

At this time, preferably, a weight ratio of the binder resin to the epoxy resin of the adhesive base film layer may be 25:75 to 55:45. That is, when the total weight of the epoxy resin and the binder resin is 100 parts by weight, the epoxy resin is contained in 30 parts by weight to 60 parts by weight, and the binder resin is contained in 40 parts by weight to 70 parts by weight. The weight ratio of the binder resin to the epoxy resin of the adhesive base film layer is preferably 30:70 to 50:50, more preferably 40:60.

When the total weight of the epoxy resin and the binder resin is 100 parts by weight, when the epoxy resin is used less than 30 parts by weight, the chemical resistance decreases and the rigidity of the adhesive resin film layer is insufficient, so that the coating of the photothermal conversion layer and the adhesive layer later may be difficult. In addition, when the epoxy resin is larger than 60 parts by weight, chemical resistance and rigidity are excellent, but the adhesive resin film layer is brittle and may be hardly used as a support film layer.

In addition, the adhesive base film layer 130 including an epoxy resin has adhesion to both the photothermal conversion layer 120 and the adhesive layer 140 that are not bonded to each other, and has hardness capable of supporting both the layers.

The adhesive base film layer 130 may include a curing agent. Preferably, a phenolic curing agent may be included. In general, amines and isocyanates may be considered as the curing agent for the epoxy resin, but there is a problem in that these curing agents are hardly filmed. The adhesive base film layer 130 may be filmed by using a phenolic curing agent as the curing agent and appropriately controlling a curing rate.

The adhesive base film layer 130 may include a curing catalyst. The curing catalyst is used in an amount such that the adhesive base film layer 130 has chemical resistance to methyl ethyl ketone (MEK), ethyl acrylate (EA), toluene, and xylene and maintains heat resistance. For example, the curing catalyst may be imidazole.

In addition, the adhesive base film layer 130 may additionally include a filler. For example, the filler may include at least one selected from the group consisting of $TiO_2$, silica, copper powder, alumina, and carbon black.

The filler may additionally prevent shrinkage and expansion of the adhesive base film layer 130. In addition, after the substrate processing process is completed, there is an additional light blocking effect on the substrate when light is irradiated to the photothermal conversion layer 120.

The adhesive base film layer 130 may be prepared and subjected to aging for a predetermined period. For example, aging of about 4 days may be performed. Due to this, the reaction of the epoxy is completely terminated, and the photothermal conversion layer 120 and the adhesive layer 140 are formed on the adhesive base film layer 130 later, or stability is improved in the substrate processing process.

The thickness of the adhesive base film layer 130 is about 10 μm to about 50 μm, preferably about 20 μm to about 40 μm, more preferably about 20 μm to about 30 μm. When the thickness of the adhesive layer 140 is less than about 10 μm, it is difficult to obtain physically sufficient strength, it may be difficult to support the photothermal conversion layer 120 and the adhesive layer 140, and it may be affected by shrinkage occurring during the curing of the adhesive layer. In addition, when the thickness of the adhesive base film layer 130 is greater than about 50 μm, evaporation of the solvent is difficult during coating, irregular holes may be formed on the film surface, and when the solvent remains, the solvent may affect the physical properties of the adhesive film.

A first liner 110 and a second liner 150 serve to support and protect the adhesive layer 140 and the photothermal conversion layer 120, respectively. The first liner 110 and the second liner 150 are removed when using the adhesive film.

The first liner 110 and the second liner 150 may be silicon-coated polyethylene terephthalate (PET), but are not limited thereto, and are sufficient as materials capable of supporting and protecting the adhesive layer 140 and the photothermal conversion layer 120.

A manufacturing process of the adhesive film according to an embodiment of the present invention is as follows.

The adhesive base film layer 130 is formed on the first liner. Thereafter, the second liner may be laminated on the adhesive base film layer 130 in a roll-to-roll method.

Thereafter, while the second liner is removed, the silicone-based adhesive layer 140 may be directly formed on the adhesive base film layer 130 and a third liner may be laminated on the adhesive layer 140.

Subsequently, while the first liner is removed, the photothermal conversion layer 120 may be directly formed on the other surface of the adhesive base film layer 130, and a fourth liner may be laminated on the photothermal conversion layer 120. That is, in the process, the fourth liner on the photothermal conversion layer 120 and the third liner on the adhesive layer 140 correspond to the first liner 110 and the second liner 150 of FIG. 1, respectively.

However, the manufacturing process of the adhesive film of the present invention is not limited thereto, and a method of forming the photothermal conversion layer 120 and the adhesive layer 140 respectively on both surfaces of the adhesive base film layer 130 in the form of a film is sufficient.

When a liquid adhesive material and a liquid photothermal conversion material are used between the substrate and the support, a process of forming the photothermal conversion layer by applying and curing the photothermal conversion material on the support and a process of forming the adhesive layer by applying and curing the adhesive material on the substrate to be processed are required, respectively. Thereafter, a process of bonding the adhesive layer and the photothermal conversion layer under vacuum is required. That is, when a liquid material is used, a coating time, a curing time, and a bonding time are required.

On the other hand, in the case of using the adhesive film in the form of a film according to the present invention, a process of removing the first liner and attaching the adhesive layer to the substrate and removing the second liner and attaching the photothermal conversion layer to the support is sufficient. Therefore, according to the present invention, it is possible to significantly reduce the time required for the process, and to reduce costs required for an applying process, a curing process, a vacuum process, and the like.

Figure 2A:
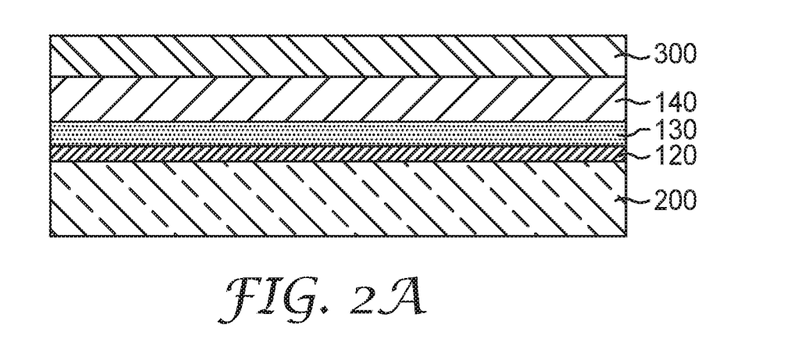
FIGS. 2A to 2C are views illustrating a process of processing a substrate using an adhesive film according to the present invention.
Figure 2B:
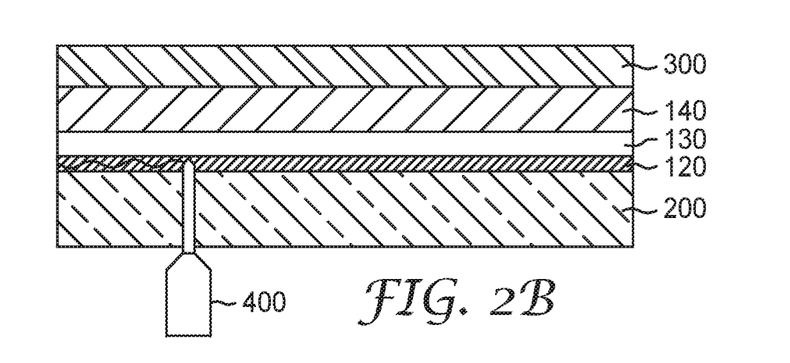
Figure 2C:
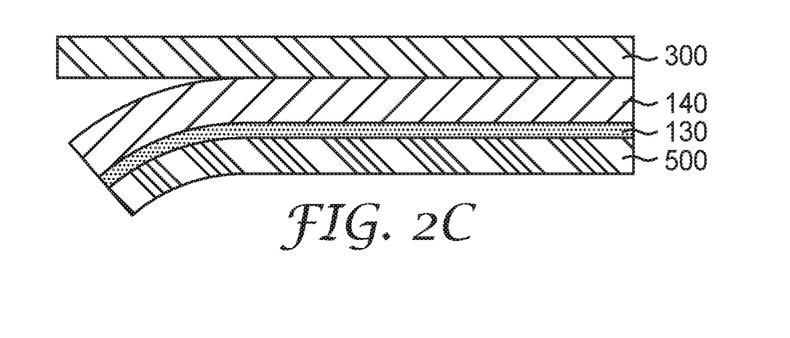

FIGS. 2A to 2C are views illustrating a process of processing the substrate using the adhesive film according to the present invention.

Referring to FIG. 2A, in the adhesive film according to the present invention, the first liner is removed and the photothermal conversion layer 120 is attached to the support 200, and the second liner is removed and the adhesive layer 140 is attached to the substrate 300. At this time, it is preferred to perform the process at about 40° C. to about 80° C., so that the adhesion between the photothermal conversion layer 120 and the support 200 is increased.

The support 200 is a material capable of transmitting radiant energy, such as a laser used in the present invention, and this material is required to keep the substrate 300 in a flat state and prevent the substrate 300 from being broken during processing and transferring. It is preferable that the support 200 is hard and transmissive.

The transmissivity of the support 200 is not limited unless radiant energy is prevented from being transmitted into the photothermal conversion layer 120 in order to enable the decomposition of the photothermal conversion layer 120. However, the transmittance is preferably, for example, about 50% or higher.

In addition, in order to prevent the substrate from being distorted during processing, it is preferable that the support 200 has sufficiently high rigidity, and the flexural strength of the support 200 is preferably $2 \times 10^{-3}$ (Pa·m$^3$) or higher, more preferably $3 \times 10^{-2}$ (Pa·m$^3$) or higher.

In addition, in order to prevent damage due to thermal history that may occur during the process performed on the substrate, it is preferable that the support 200 has sufficient heat resistance, and a heat deflection temperature of the support 200 is preferably 550° C. or higher, more preferably 700° C. or higher.

The support 200 may be, for example, glass. In addition, in order to improve the adhesive strength to an adjacent layer, such as the photothermal conversion layer 120, the support 200 may be surface-treated with a binder or the like, if necessary.

Thereafter, after fixing the substrate 300 and the support 200 with an adhesive film including the photothermal conversion layer 120, the adhesive base film layer 130 and the adhesive layer 140 interposed therebetween, the substrate 300 is processed.

The substrate 300 is a substrate which is fixed to the support 200 and processed, and then separated from the support 200, and for example, may be a wafer or a substrate for a flexible display device.

As an example, the substrate 300 may include a semiconductor wafer such as silicon and gallium arsenide, a crystal wafer, sapphire, or glass. A circuit surface of the substrate 300 may be bonded to the adhesive layer 140. Thereafter, a surface of the substrate 300 which is not bonded to the adhesive layer 140 may be ground by a grinder or the like to be processed into a thinned substrate.

As another example, the substrate 300 may be an epoxy mold wafer. A mold surface of the substrate 300 may be bonded to the adhesive layer 140, and then, the substrate may be processed as a substrate completed by performing a predetermined process for connecting a circuit to the surface of the substrate 300 that is not bonded to the adhesive layer 140.

On the other hand, as yet another example, the substrate 300 may be a plastic or metal thin film or the like as a flexible substrate. For example, the substrate 300 may be PI. However, the present invention is not limited thereto, and a material having a flexible property may be sufficient as a material that may be used as a substrate for a flexible display device.

For example, the 'processing' may include a process of forming an element layer on the substrate 300. Although not illustrated, the element layer consists of a plurality of thin film layers and electrical elements, and more specifically, may include a thin film transistor including a gate electrode, a semiconductor layer, a source electrode and a drain electrode.

The flexible display device may be any one selected from the group consisting of an organic light emitting diode display, a liquid crystal display, and an electrophoretic display. However, the flexible display device is not limited thereto, and may include all flexible display devices using a flexible substrate.

Referring to FIG. 2B, after a desired level of processing, the support 200 and the processed substrate 300 are separated from each other by irradiating a laser 400. The laser 400 is irradiated from the support 200 side.

A light absorber of the photothermal conversion layer 120 absorbs the radiant energy by the laser 400 and converts the absorbed energy into thermal energy. The generated thermal energy rapidly increases the temperature of the photothermal conversion layer 120, and the temperature causes decomposition of a thermally decomposable resin in the photothermal conversion layer 120. The gas generated by thermal decomposition forms a pore layer in the photothermal conversion layer 120 and divides the photothermal conversion layer 120 into two parts, and as a result, the support 200 and the processed substrate 300 are separated from each other.

The thermally decomposable resin in the photothermal conversion layer 120 is decomposed by irradiation of the laser 400 to form cracks inside the layer to separate the photothermal conversion layer itself. The air (Gas) produced by the decomposition of the resin is eventually introduced between the two layers to separate the two layers. Therefore, in order to promote the introduction of the air, it is preferable to perform the irradiation of the laser 400 from the edge of the photothermal conversion layer 120 to the inside of the photothermal conversion layer 120.

In order to use the laser 400 from the edge of the photothermal conversion layer 120, a method of applying the laser 400 while linearly reciprocating from the edge, or alternatively, a method of irradiating the laser 400 spirally from the edge to center, such as a gramophone, may be used.

The laser 400 is generally a laser having a wavelength of about 300 to about 11,000 nm, preferably about 300 to about 2,000 nm, and a specific example thereof includes a YAG laser emitting light at a wavelength of 1,064 nm, a YAG laser of generating a second harmonic wave at a wavelength of 532 nm, and a semiconductor laser having a wavelength of 780 to 1,300 nm.

Referring to FIG. 2C, after the support 200 is removed, the adhesive base film layer 130 and the adhesive layer 140 on the processed substrate 300 are removed. In order to remove the adhesive base film layer 130 and the adhesive layer 140, it is preferred to use a removal tape 500 having adhesion with the adhesive base film layer 130 stronger than the adhesion between the processed substrate 200 and the adhesive layer 140.

The removal tape 500 is disposed to be bonded on the adhesive base film layer 130, and then peeled off together with the adhesive base film layer 130 and the adhesive layer 140 to remove the adhesive base film layer 130 and the adhesive layer 140 from the processed substrate 300.

Although not clearly illustrated in the drawing, after the photothermal conversion layer 120 is divided on the adhesive base film layer 130, a part of the photothermal conversion layer 120 may remain. The remaining part is also removed together when using the removal tape 500.

Meanwhile, although not illustrated in the drawing, after the support 200 is removed, a removal solution may be used to remove the adhesive base film layer 130 and the adhesive layer 140. Preferably, the adhesive base film layer 130 and the adhesive layer 140 in which the photothermal conversion layer is partially left may be immersed in the removal solution to remove the adhesive base film layer 130 and the adhesive layer 140. Preferably, the adhesive layer 140 may be immersed in the removal solution for about 10 seconds to 60 seconds.

In addition, such a removal solution may include trans-1,2-dichloroethylene and hydrofluoroether.

When the size or area of the processed substrate 200 is large, it may be difficult to remove the adhesive base film layer 130 and the adhesive layer 140 at once with the removal tape 500. However, when using the removal solution, it is advantageous to remove the adhesive base film layer 130 and the adhesive layer 140 having large areas. In addition, an additional external physical force is not required, and there is an effect of removing the adhesive base film layer 130 and the adhesive layer 140 without residues in a short time.

The processing method of the substrate according to the present invention is eco-friendly because a solvent is not required when processing the substrate by using a prepared adhesive film. In addition, in the case of using the prepared adhesive film, when the substrate is processed, the exposure of the support and the substrate to heat and UV is reduced, thereby preventing additional damage.

In addition, the process of directly applying and curing the adhesive material or the photothermal conversion material on the support or the substrate may be omitted, and thus, the process is simplified, thereby reducing process costs and time. Furthermore, the processing method is advantageous to form a uniform thickness of the adhesive layer and the photothermal conversion layer, and may also be used in processing a large-area substrate.

Hereinafter, the present invention will be described in more detail through Experimental Examples, but the following Experimental Examples are only intended to illustrate the present invention and are not intended to limit the present invention. That is, the embodiments of the present invention may be modified in various forms, and the scope of the present invention should not be interpreted to be limited to Experimental Examples to be described below.

EXAMPLES

Preparation Example

Preparation Example 1—Preparation of Adhesive Base Film Layer 40 g of a solvent (MEK/EA) was prepared. 11 g of an epoxy resin and 9 g of a phenolic resin curing agent were added to the solvent. A ratio of the epoxy resin and the phenolic resin curing agent was 1:1 based on an equivalent weight. The solution was stirred for 15 minutes at 30 RPM using a stirrer to completely dissolve the solid epoxy resin and phenol resin.

80 g of a solid content of an elastomer resin was further added to the solution. The solution was sufficiently stirred for 30 minutes at 30 RPM using the same stirrer to form an epoxy/elastomer mixture.

0.1 g of imidazole as a curing catalyst was aliquoted in a separate container, and then 10 g of a solvent (MEK/EA) was additionally added to be completely dissolved.

The dissolved imidazole solution was added to the prepared epoxy/elastomer mixture. The solution was stirred for 15 minutes at 30 RPM using the same stirrer.

The prepared solution was degassed for 30 minutes using a vacuum pump and a vacuum desiccator to form a mixture. Thereafter, the mixture was filtered using a 250 to 300 mesh filter.

The filtered solution was coated on a PET liner of which both surfaces of 50 μm thick were release-treated with silicone. The coating was performed on a tight release surface. The drying and curing were performed at 130° C. for 2 minutes, the thickness of the coated film was 25 μm after drying. The coated film was wound in a roll form and prepared.

The prepared adhesive base film layer was aged for 4 days in an aging furnace at 45° C.

Preparation Example 2—Preparation of Adhesive Layer 80 g of a solvent (Toluene/Xylene) was prepared. Benzoyl peroxide (BPO) (Pergan) was added to the solvent. The adding amount was 3.5 wt % compared to the solid content of a radical curable silicone resin to be added later. BPO was stirred at 10 RPM for 15 minutes using a stirrer to be completely dissolved.

100 g of a silicone resin Q2-7406 (Dow corning, 56.5 wt %) was added to the dissolved BPO solution and stirred for 30 minutes again in the same manner. The solution was degassed for 30 minutes using a vacuum pump and a vacuum desiccator to form a mixture. Thereafter, the mixture was filtered using a 250 to 300 mesh filter.

The filtered solution was coated on the adhesive base film layer prepared in Preparation Example 1. After drying at 180° C. for 2 minutes, the filtered solution was coated to have a thickness of 30 μm of the coated film. After drying the coated film, a fluorine-treated 50 μm release PET liner was bonded and then wound in a roll form to be prepared.

Preparation Example 3—Preparation of Photothermal Conversion Layer 6 wt % of carbon black (Cancarb) having a particle size of 240 nm, 4 wt % of Titania (Huntsman) having a particle size of 240 nm, and 1 wt % of a dispersant (BYK Chemie Japan Co., Ltd.) were added to 75 wt % of methyl ethyl ketone (MEK, Samchun Chemical Co., Ltd.) and dispersed for 30 minutes using an ultrasonic disperser to prepare a solution dispersed with a light absorber. 7 wt % of a high molecular weight acrylic polymer elastomer instead of PSA having a weight average molecular weight of 1,000,000 g/mol and containing a COOH/OH functional group of 10 mgKOH/g or more, and 7 wt % of a low molecular weight acrylic polymer elastomer instead of PSA having a weight average molecular weight of 500,000 g/mol and containing a COOH/OH functional group of 5 mgKOH/g or more were mixed and stirred for 30 minutes with a stirrer to prepare a thermally decomposable resin. The thermally decomposable resin was added to the solution dispersed with the light absorber, and then stirred again for 20 minutes. Then, methyl ethyl ketone (MEK) was added so that the mixture had a viscosity (200 CPS to 5,000 CPS) suitable for coating.

The solution was coated on the adhesive base film layer prepared in Preparation Example 1. However, the adhesive layer was coated on an opposite surface to the coated surface, and coated after the PET liner of the adhesive base film layer was removed before coating. After drying at 90° C. for 1 minute, the solution was coated to have a thickness of the coated film of 10 μm and dried.

Thereafter, the adhesive film was aged in an oven at 45° C. for 15 hours to complete the adhesive film.

Example

In Preparation Example 1, an adhesive film was prepared by applying types and contents of each component as shown in the following Table. The components and contents of each Example were shown in Table 1 below.

TABLE 1

| | | Example 1* | Example 2* | Example 3* | Example 4 | Example 5 | Example 6 | Example 7 | Example 8* | Example 9* |
|---|---|---|---|---|---|---|---|---|---|---|
| Weight ratio of epoxy resin: binder resin | | 100:0 | 0:100 | 0:100 | 20:80 | 20:80 | 40:60 | 40:60 | 25:75 | 70:30 |
| Epoxy resin | Multifunctional epoxy | 30 | — | — | 11 | 9.5 | 21 | 12 | 6 | — |
| | Bifunctional epoxy | 15 | — | — | — | — | — | — | 3 | 2 |
| | Crystalline epoxy | 20 | — | — | — | — | — | — | 4 | 41 |
| | Core-shell type epoxy | — | — | — | — | — | — | 8 | — | — |
| Curing agent | Phenolic resin | 35 | — | — | 9 | 8.5 | 19 | 15 | 7 | 27 |
| Binder resin | Elastomer (carboxyl functionality) | — | 65 | — | — | — | — | — | — | 12 |
| | Elastomer (glycidyl functionality) | — | — | 87 | 80 | 72 | 60 | 50 | 60 | 18 |
| Curing catalyst | Imidazole | 0.3 wt % | — | — | 0.3 wt % | 0.3 wt % | 0.3 wt % | 0.3 wt % | 0.3 wt % | 0.3 wt % |
| Filler | Metal filler | — | — | 4.5 | — | — | — | 15 | 20 | — |
| | Organic filler | — | 22.5 | 5.5 | — | — | — | — | — | — |
| | Inorganic filler | — | 7.5 | — | — | 10 | — | — | — | — |
| Additive | Dispersant | — | 5 | 3 | — | — | — | — | — | — |

*indications were not the present invention.

The materials used in the above table were as follows.

Multifunctional epoxy resin: YDCN-500-4P (KUKDO), YDCN-500-8P (KUKDO), KDCP-100 (KUKDO), KDCP-150 (KUKDO), and KDCP-200 (KUKDO).

Bifunctional epoxy resin: YD-011 (KUKDO), YD-012 (KUKDO), YD-017 (KUKDO)

Crystalline epoxy resin: YX4000H (Mitsubishi Chemical Corporation), YSLV-80XY (Nippon Steel & Sumitomo Metal), or YSLV-120TE (Nippon Steel & Sumitomo Metal)

Core-shell type epoxy resin: MX-136 (Kaneka), MX-138 (Kaneka) and B-tough-A3 (Croda), YP-50 (KUKDO)

Curing agent (Phenolic Novolac): KPH-2001 (Kolon), TD2131 (DIC Corporation), MEH-7800-SS (MEIWA) and MEH-7800-45 (MEIWA), MEH-800-SSKC (MEIWA)

Elastomer (Mw: 300,000 to 1,000,000): NBR (Acrylonitrile 40%, Kumho Petrochemical), WS-023 (Nagase Chemtex), SG-708-6 (Nagase Chemtex), SG-P3-TEA (Nagase chemtex)

Curing catalyst (Imidazole): 2PZ-CN (Shikoku), 2PZ-PW (Shikoku), 2PHZ-PW (Shikoku)

Filler: CUSP03 (JoinM), CUSP05 (JoinM), Sterlling1120 (Cabot), Thermax N990 (Cancab), TR72 (Huntsman) and TR92 (Huntsman), R972, SO31R Dispersant: BYK111 (BYK), DISPERBYK-161 (BYK), BYK2131 (BYK), BYK2150 (BYK), KD6 (Croda), KD8 (Croda), KD9 (Croda)

The experimental results of Examples 1 to 9 were shown in Table 2 below.

On the other hand, referring to Examples 4 and 5, when additionally including a filler, it is possible to impart rigidity to the film and suppress shrinkage.

Although the embodiments according to the present invention have been described above, they are only examples and it will be understood to those skilled in the art that various modifications and equivalent embodiments are enabled therefrom. Therefore, the protective scope of the present invention should be construed to include not only the following claims but also equivalents thereto.

DESCRIPTION OF REFERENCE NUMERALS

110: First liner, 120: Photothermal conversion layer, 130: Adhesive base film layer 140: Adhesive layer, 150: Second liner, 200: Support, 300: Substrate, 400: Laser, 500: Removal tape.

What is claimed is:

1. An adhesive film comprising:
   an adhesive layer;
   a photothermal conversion layer containing a light absorber and a thermally decomposable resin; and
   an adhesive base film layer disposed between the adhesive layer and the photothermal conversion layer,
   wherein the adhesive base film layer contains a multifunctional epoxy resin, a binder resin, a curing agent, and a curing catalyst.

2. The adhesive film of claim 1, wherein the adhesive layer is a silicon-based adhesive layer.

3. The adhesive film of claim 1, wherein the thermally decomposable resin contains two kinds of acrylic resins having a functional group of —COOH or —OH and different weight average molecular weights.

TABLE 2

| | | Example 1* | Example 2* | Example 3* | Example 4 | Example 5 | Example 6 | Example 7 | Example 8* | Example 9* |
|---|---|---|---|---|---|---|---|---|---|---|
| Weight ratio of epoxy resin: binder resin | | 100:0 | 0:100 | 0:100 | 20:80 | 20:80 | 40:60 | 40:60 | 25:75 | 70:30 |
| Surface roughness | | — | ○ | Δ | ○ | Δ | ○ | Δ | Δ | ○ |
| Filming | | x | ○ | ○ | ○ | ○ | ○ | Δ | Δ | x |
| Role as base film | Adhesive layer coating | ○ | ○ | ○ | ○ | ○ | ○ | ○ | ○ | ○ |
| | Photothermal conversion layer coating | ○ | Entirely dissolved | Partially dissolved | Partially wrinkled | ○ | ○ | Partially wrinkled | Entirely wrinkled and Partially dissolved | ○ |

Referring to Table 2, in Example 1 to which the binder resin was not applied, it was confirmed that the epoxy resin alone was very brittle, difficult to be coated, and disabled in filming itself. Further, even in the case where there was no ratio of a multifunctional epoxy resin as in Example 9, the film was very brittle and not filmed. In addition, in Examples 2 and 3 in which the epoxy resin was not included, the chemical resistance was insufficient, and thus, the adhesive base film layer was dissolved when coating the photothermal conversion layer. In addition, as in Example 7, it was confirmed that even if an epoxy resin was included, when the multifunctional epoxy resin was too small, the hardness of the epoxy was low and thus, the film did not have sufficient chemical resistance in a solvent such as methyl ethyl ketone (MEK).

4. The adhesive film of claim 1, wherein the adhesive base film layer has adhesion to both the adhesive layer and the photothermal conversion layer.

5. The adhesive film of claim 1, wherein the curing agent is a phenolic curing agent.

6. The adhesive film of claim 1, wherein the binder resin is an elastomer resin having a weight average molecular weight of 500,000 to 1,500,000.

7. The adhesive film of claim 1, wherein the binder resin is an acryl or rubber-based elastomer resin.

8. The adhesive film of claim 6, wherein the binder resin has an epoxy group in a chain.

9. The adhesive film of claim 1, wherein the adhesive base film layer further comprises a filler.

10. The adhesive film of claim 9, wherein the filler includes at least one selected from the group consisting of $TiO_2$, silica, copper powder, alumina, and carbon black.

11. The adhesive film of claim 1, wherein a weight ratio of the binder resin to the epoxy resin of the adhesive base film layer is 25:75 to 55:45.

12. The adhesive film of claim 1, wherein the curing catalyst of the adhesive base film layer is imidazole.

* * * * *